US012761177B2

(12) United States Patent
Kurfiss et al.

(10) Patent No.: US 12,761,177 B2
(45) Date of Patent: Oct. 13, 2026

(54) ELECTRICAL CONTACT FREE METHOD FOR MEASURING RESIDUAL SOLVENT WITHIN AN EMULSION OR POROUS MEDIA

(71) Applicant: Analog Devices International Unlimited Company, Limerick (IE)

(72) Inventors: Neal Tait Kurfiss, Newburyport, MA (US); Jonathan Ephraim David Hurwitz, Edinburgh (GB)

(73) Assignee: Analog Devices International Unlimited Company, Limerick (IE)

( * ) Notice: Subject to any disclaimer, the term of this patent is extended or adjusted under 35 U.S.C. 154(b) by 137 days.

(21) Appl. No.: 18/670,254

(22) Filed: May 21, 2024

(65) Prior Publication Data

US 2025/0362263 A1 Nov. 27, 2025

(51) Int. Cl.
*G01N 27/22* (2006.01)
*G01B 11/06* (2006.01)

(52) U.S. Cl.
CPC ........... *G01N 27/223* (2013.01); *G01B 11/06* (2013.01)

(58) Field of Classification Search
None
See application file for complete search history.

(56) References Cited

U.S. PATENT DOCUMENTS

| | | | | |
|---|---|---|---|---|
| 3,339,137 A * | 8/1967 | Perry | G01N 27/223 | 324/683 |
| 3,593,128 A * | 7/1971 | Perry | G01N 27/223 | 324/683 |
| 4,433,286 A * | 2/1984 | Capots | G01R 27/2623 | 324/674 |
| 6,388,453 B1 * | 5/2002 | Greer | G01N 9/24 | 324/667 |
| 6,756,793 B2 * | 6/2004 | Hirono | G01R 27/2605 | 73/335.04 |
| 7,068,050 B2 * | 6/2006 | Steele | G01N 9/24 | 324/683 |
| 8,305,091 B2 * | 11/2012 | Boschetti | G01N 33/46 | 324/689 |
| 8,410,796 B2 * | 4/2013 | Boschetti | G01N 33/46 | 324/670 |
| 11,324,374 B2 * | 5/2022 | Jung | A47L 11/24 | |
| 12,152,924 B2 * | 11/2024 | Schramm | G01F 23/266 | |
| 12,594,585 B2 * | 4/2026 | MacKay | B08B 3/00 | |
| 2013/0088245 A1 * | 4/2013 | Sezginer | G03F 1/84 | 324/679 |

FOREIGN PATENT DOCUMENTS

DE 102025118006 A1 11/2025

* cited by examiner

*Primary Examiner* — Richard Isla
(74) *Attorney, Agent, or Firm* — Schwegman Lundberg & Woessner, P.A.

(57) ABSTRACT

A measurement apparatus includes at least one conductive sensing plate; and a capacitance measurement circuit connected to the sensing plate. The capacitance measurement circuit is configured to measure a capacitance that includes the sensing plate, a substrate, and a residual solvent on the substrate when the substrate is arranged below the sensing plate and provide information of the residual solvent on the substrate using the measured capacitance.

20 Claims, 4 Drawing Sheets

ELECTRICAL CONTACT FREE METHOD FOR MEASURING RESIDUAL SOLVENT WITHIN AN EMULSION OR POROUS MEDIA

FIELD OF THE DISCLOSURE

This document pertains generally, but not by way of limitation, to manufacture of battery electrodes. Some embodiments relate to improved methods of measuring residual solvent in the manufacturing process of battery electrodes.

BACKGROUND

In industries such as lithium-ion battery manufacturing and similar industries, the manufacturing process may involve drying media that has been deposited on sheets. For example, a battery manufacturing process may involve depositing media on foil sheets to form electrodes for batteries. There is significant energy and cost in drying the deposited media to a point that there is no moisture or wet solvent remaining in the media.

BRIEF DESCRIPTION OF THE DRAWINGS

In the drawings, which are not necessarily drawn to scale, alike numerals may describe similar components in different views, whilst numerals having different letter suffixes may represent different instances of similar components. The drawings illustrate generally, by way of example, but not by way of limitation, various embodiments discussed in the present document.

DETAILED DESCRIPTION

Some manufacturing processes may involve drying media that has been deposited on sheets (e.g., foil sheets) or other substrates. The media may begin as a slurry containing solvents and the slurry is deposited on the substrate (e.g., as an emulsion) and the media is dried. In industries such as battery manufacturing, the deposited media is dried and the solvent or moisture in the slurry is evaporated. The deposited media and foil are fragile and cannot be touched or the media will be damaged. As explained previously herein, there is significant energy and cost in drying the deposited media in these kinds of processes.

Non-contact techniques are described herein of measuring localized residual solvents within a medium so that the drying process can target the areas that need the most drying and save energy from drying areas that are already dry. Information on the moisture could also be used to optimize the drying profile, i.e., the amount and rate of change of temperature or flow so as to optimize the layer formation or reduce the possibilities of defects. The techniques measure an electromagnetic impedance of deposited media and the electromagnetic impedance changes with the amount of residual solvent in the media. This approach enables identifying areas of the substrate that need drying and those areas that have dried in the process and need no further drying. These techniques also potentially identify the amount of drying to be use. The asymptoted value of measurement may also be useful in indicating the final consistency of the film.

Figure 1:
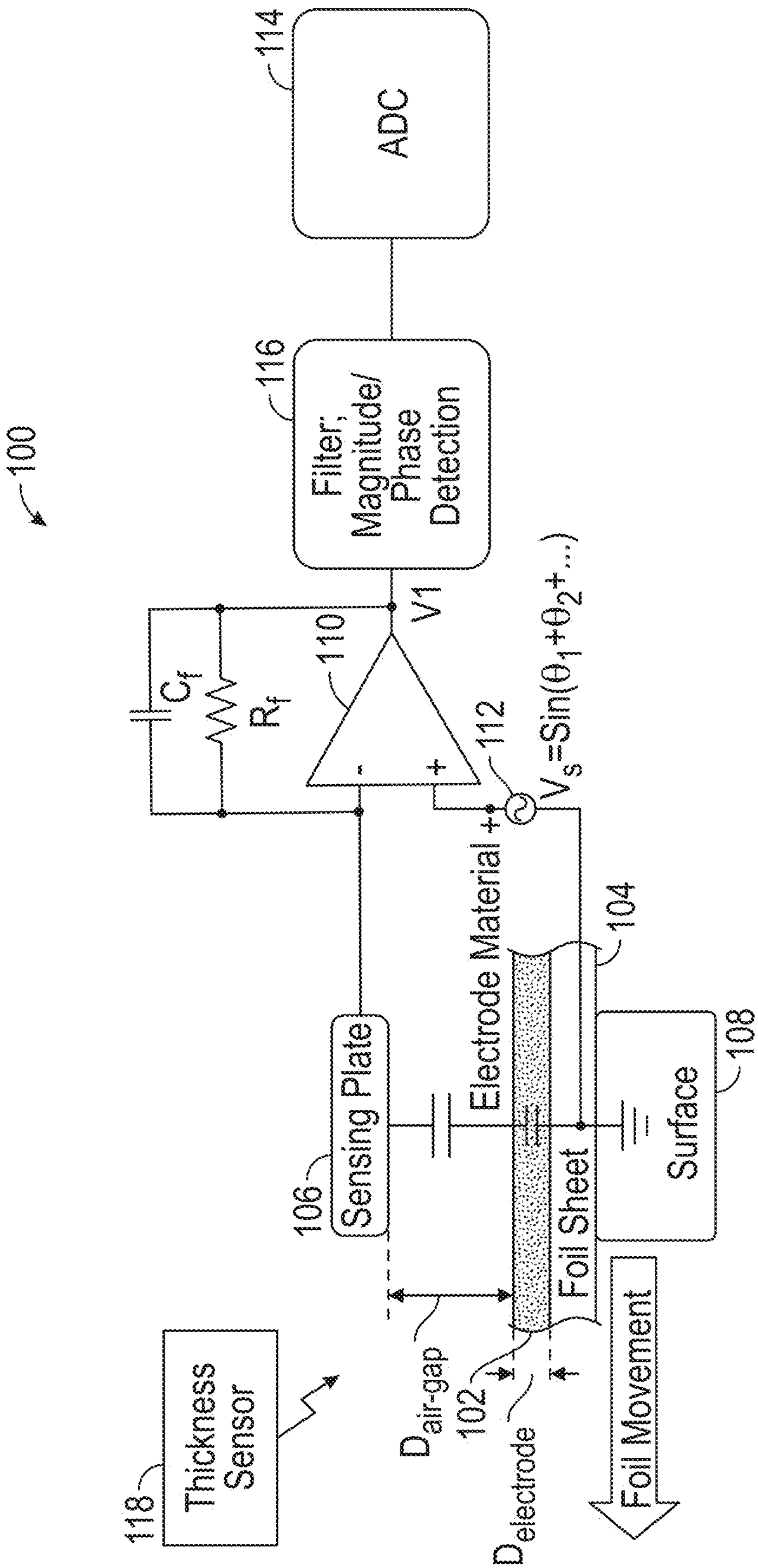
FIG. 1 is a diagram of a measurement device to detect residual solvent in media deposited on a substrate.

FIG. 1 is a diagram of a measurement device 100 to detect residual solvent in media deposited on a substrate. The media 102 is an electrode material deposited on substrate 104 that is a foil sheet. The media is dried to form an electrode that may be porous. The measurement device 100 includes a conductive sensing plate 106. The sensing plate 106 may be square, rectangular, or circular. In the example of FIG. 1, the measurement device 100 includes a circuit connected to the sensing plate 106 that measures a capacitance that includes the capacitance of the deposited media 102. The sensing plate 106 and the substrate 104 form a parallel plate capacitor. There is an air gap between the sensing plate 106 and the media 102. The air gap is non-conductive, and the presence of the air gap prevents damage to the media 102 being measured.

The measurement circuit measures capacitance that includes the air gap capacitance from the sensing plate 106 to the deposited media 102 and the capacitance of the media to the substrate 104. In the example of FIG. 1, the substrate 104 is on a surface plate 108 or other surface that may be grounded. In examples where the substrate 104 is not conductive (e.g., the substrate 104 may be a polymer), the surface plate 108 is conductive (e.g., a metal) and the measurement circuit measures capacitance that includes the air gap capacitance from the sensing plate 106 to the deposited media 102 and the capacitance of the media and the substrate 104 to the surface plate 108. The capacitance will be modulated by the amount of residual solvent or moisture in the media 102. There may be other material in the capacitance gap between the plates other than air and the media being measured. For example, there may be a protective film on top of the sensing plates to protect it from oxidizing or as a sacrificial layer that can be replaced should the surface get dirty, rather than replacing all the electronics.

The measurement circuit includes an amplifier 110 and a signal source 112 that applies an electrical signal between the sensing plate 106, substrate 104, and media 102, by modulating the positive input of the amplifier 110. The amplifier 110 includes feedback capacitor $C_f$ and feedback resistor $R_f$. In the example of FIG. 1, the signal source 112 with amplifier 110 applies a modulating voltage signal $V_S$ between the sensing plate 106 and substrate 104, and the measurement circuit measures resulting current to determine capacitance. In variations, the signal source 112 applies a modulating current signal to the sensing plate 106 and substrate 104 and the measurement circuit measures voltage to determine capacitance. The measurement circuit includes an analog-to-digital converter (ADC) 114 to produce digitized values related to the measured capacitance. The measurement circuit optionally includes circuit elements 116 for filtering or for detecting magnitude and phase of the resulting current or voltage signal. The measurement circuit may also be positioned after the ADC and the filtering and/or the detecting magnitude and phase may be done in the digital domain.

For frequencies in the passband of the filtering, the voltage at the output of the amplifier 110 $V_1$ is $$V_1 = V_s \times \left(1 + \frac{C_{Plate}}{C_f}\right),$$

where $C_{Plate}$ is the capacitance of the parallel plate capacitor formed using the sensing plate 106 and substrate 104 and may include capacitance of the surface plate 108 in some examples.

For a parallel plate capacitor, capacitance C can be calculated by $$C = \frac{\varepsilon_0 \varepsilon_r A}{d}$$

where $\varepsilon_0$ is permittivity of free space, $\varepsilon_r$ is relative permittivity, A is area, and d is distance between plates. In the example of FIG. 1, $D_{air\text{-}gap}$ is the distance from the sensing plate 106 to the media 102, and $D_{electrode}$ is the thickness of the media 102, which is electrode material in the example. When the media 102 is dry, the capacitance of the media is $$\frac{1}{C_{Dry\ Media}} = \frac{1}{C_{Powder}} + \frac{1}{C_{Air}},$$

where $C_{Powder}$ is the capacitance of the material used for the media. When the media is not dry, the capacitance is $$\frac{1}{C_{Wet\ Media}} = \frac{1}{C_{Powder+Solvent}} + \frac{1}{C_{Air}},$$

where $C_{Powder+Solvent}$ is the capacitance of the material used for the media with solvent present in the media. The max change in capacitance ΔCMax is $$\Delta C_{Max} = \frac{\varepsilon_0 \varepsilon_R A}{D_{electrode}} \times \left(1 - \frac{\varepsilon_{r-Dry\_elec} \times D_{Dry-electrode}}{\varepsilon_{r-solvent} \times D_{Wet-electrode}}\right)$$

where $\varepsilon_{r\text{-}Dry\_elec}$ is relative permittivity of the dry media material, $\varepsilon_{r\text{-}Solvent}$ relative permittivity of the solvent in the media material, $D_{Dry\text{-}electrode}$ is the thickness of the media 102 on the substrate 104 when dry, and $D_{Dry\text{-}electrode}$ is the thickness of the media 102 on the substrate when it includes solvent. The capacitance of wet media will be higher than capacitance of dry media.

By monitoring changes in the capacitance of the substrate 104, the residual solvent on the substrate 104 can be determined. An estimate of the residual solvent can be calculated from a nominal estimate of the thickness of the film 102. Optionally, the measurement device 100 includes a thickness sensor 118 to measure the thickness of the media 102, or can receive an input from a thickness measurement device external to measurement device 100. The thickness sensor 118 may be an optical thickness sensor, ultrasound thickness sensor, or the like. The thickness measurement allows a calculation of the residual solvent in the medium on the substrate 104 using the measured thickness and the capacitance of the medium on the substrate 104. The air and flow of the air that passes between the plates may be measured and used to adjust the model of the capacitance measurement for the component that is between the sensing plate and the media. In variations, a deliberate air flow (or other gas) may be passed between the plates while making a measurement.

The substrate 104 can be movable by a movement mechanism, and the movement mechanism may move the substrate relative to the surface plate 108 or the movement mechanism may move both the substrate and the surface plate 108 relative to the sensing plate 106. The movement can also be through moving the sensing plate. The measurement device 100 can measure capacitance at different locations of the substrate to detect residual solvent at the different locations. Movement in the X and Y direction can then give spatial information that can tell different residual solvent levels in different areas. The drying of the substrate can then be focused to these areas.

Figure 2:
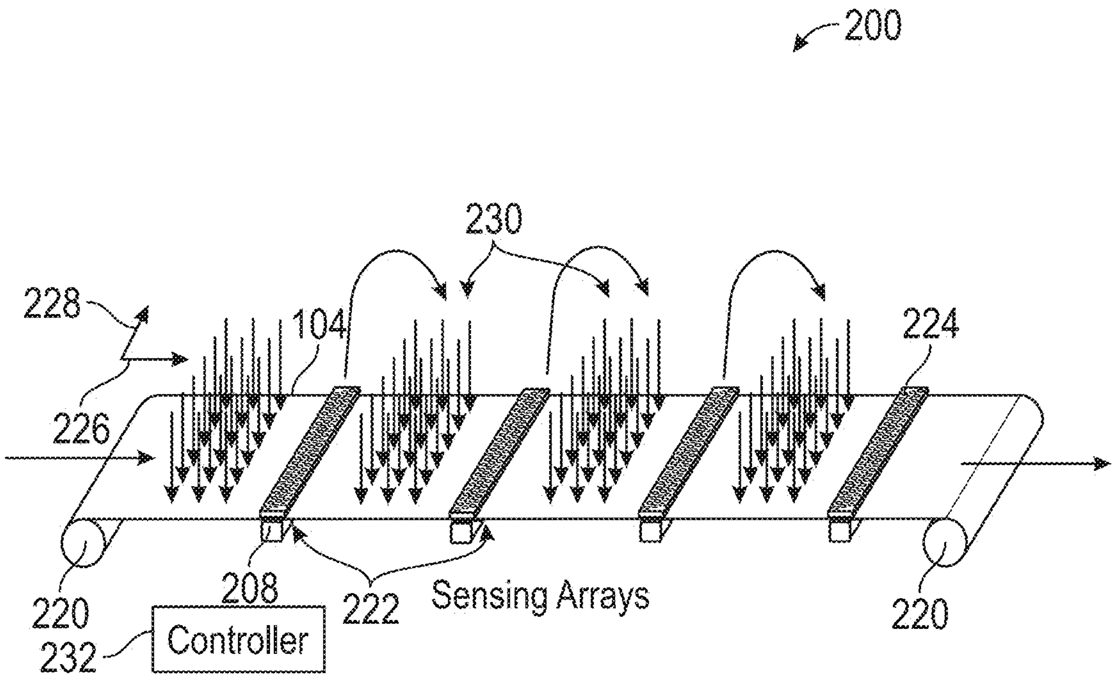
FIG. 2 is a diagram of a system to detect residual solvent in a medium that is disposed on a substrate.

FIG. 2 is a diagram of a system 200 to detect residual solvent in a medium that is disposed on a substrate 104, such as the substrate 104 in FIG. 1. The system 200 includes a roller and belt mechanism that moves sheets of the substrate 104 from roller 220 to roller 220. The sheets include absorptive media. In some examples, the substrates 104 are sheets of foil and the absorptive media is deposited on the sheets during an electrode making process.

The system 200 includes sensing arrays 222 that are arrays of multiple electromagnetic impedance sensors. The electromagnetic impedance sensors 224 may be capacitance sensors such as the measurement devices 100 of FIG. 1, and the sensor may include a surface plate or other solid surface 208 below the substrate. In the example of FIG. 2, the sensing arrays 222 arrays include a two-dimensional (2D) arrangement of electromagnetic impedance sensors 224. In the example of FIG. 2, the electromagnetic impedance sensors 224 extend in a first dimension direction 226 parallel to the substrate sheet and in a second dimension direction 228 perpendicular to the substrate sheet. In some examples, the sensing arrays 222 arrays include a one-dimensional (1D) arrangement of electromagnetic impedance sensors 224, such as one row of electromagnetic impedance sensors 224 extending in direction 228. In the 2D example of FIG. 2, the electromagnetic impedance sensors 224 of one row may be offset from the electromagnetic impedance sensors 224 of the adjacent row. The offset between rows may reduce crosstalk between neighboring electromagnetic impedance sensors 224 and the offset may cover gaps between sensors allowing coverage of more of the area between different rows.

The system may include a controller 232. The controller 232 includes logic circuitry to perform the functions described. The logic circuitry may include a microprocessor, an application specific integrated circuit (ASIC), or other type of processor, interpreting or executing instructions included in software or firmware. The controller 232 may provide detection logic circuitry to detect the residual solvent in the media 102 on the substrate 104 using the electromagnetic impedance measured by the electromagnetic impedance sensors 224. In some examples, the sensing arrays 222 include one or more thickness sensors, and the controller 232 detects residual solvent in the media 102 on the substrate 104 using the measured electromagnetic impedance and the measured thickness of the media 102.

In the example of FIG. 2, the system 200 includes multiple sensing arrays 222. The substrate is moved left to right in FIG. 2. Prior to the impedance sampling by the sensing arrays 222, the substrate 104 passes through a heating stage 230. The sensing array 222 following the heating stage provides information of the residual solvent on the substrate that was not evaporated by the heating. The arrangement of the electromagnetic impedance sensors 224 in the sensing arrays 222 can provide location information of the residual solvent. The controller 232 may adjust subsequent heating stages using the location information to enable localized heating on the substrate to target the detected residual solvent instead of applying heating to the entire substrate area. This can reduce energy used in drying the later stages. It can be seen that an additional array of sensors 222 could be included before the first heating stage 230 in order to direct the first heating function. Optionally, the heating optimization may be run in open loop and with only one stage of measurement before one stage of heating. The speed of the belt can be factored in to the combination of the results of multiple horizontal sensing plates to allow for motion blur in the measurements, and a decorrelation function be applied that factors in the belt speed. The sample rate of calculation and the combination of samples from multiple sensors can be adjusted to be largely dependent on the belts speed, and mention that the belt speed could be measured by the equipment by timing the periods when the calendared areas appear with no material on, or be provided by a control input with either knowledge or measurements of the roller/belt drive.

Figure 3:
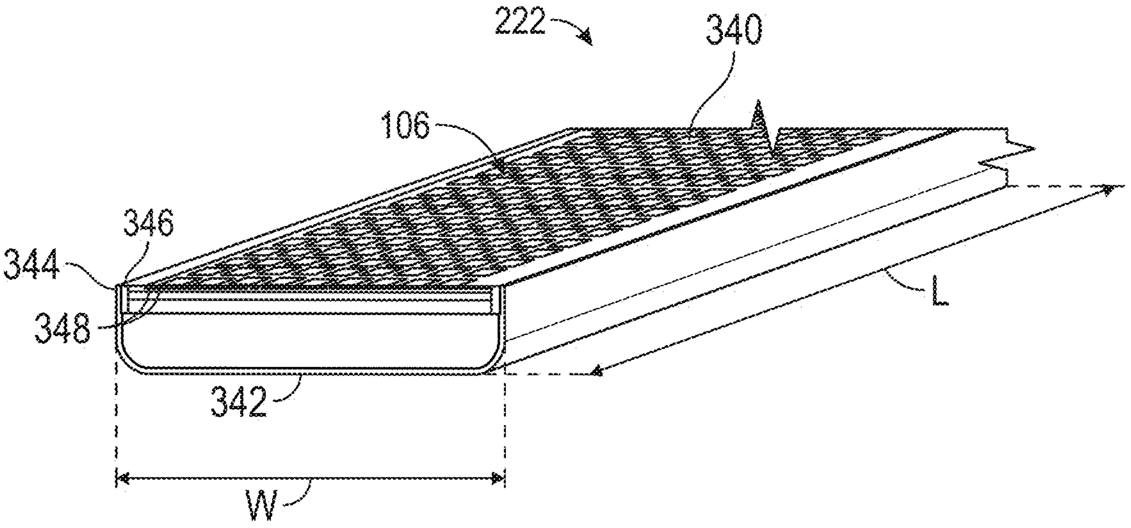
FIG. 3 is an illustration of an example of a sensing array to detect residual solvent in a medium that is disposed on a substrate.

FIG. 3 is an illustration of an example of a sensing array 222. The sensing array 222 includes multiple sensing plates 106 arranged in a 2D array of sensing plates 106. In the FIG. 3, the sensing ray 222 is shown upside down and the sensing plates 106 are exposed on the facing side 340 of the sensing array 222 that faces the substrate and media to be measured. The width (W) axis of the sensing array 222 is the axis of motion of the media in FIG. 2. The length (L) axis of the sensing array 222 extends in the width dimension of the substrate 104 in FIG. 2. The sensing array 222 has a top side 342 and sidewall 344 that may include metal and may be earth grounded. The facing side 342 may have an edge 346 that may also be earth grounded metal. The sensing array 22 includes a guard conductor 348. The guard conductor 348 surrounds each of the sensing plates 106 on all sides except for the facing side of the sensing plates 106 that faces the substrate 104. The guard conductor 348 that may include metal. Alternate columns of sensors may be staggered so as to give information in the gaps between sensors, as previously mentioned. There may also be thin guard electrodes between different sensor plates to minimize crosstalk. It may be possible to run different sensors at a time.

Figure 4:
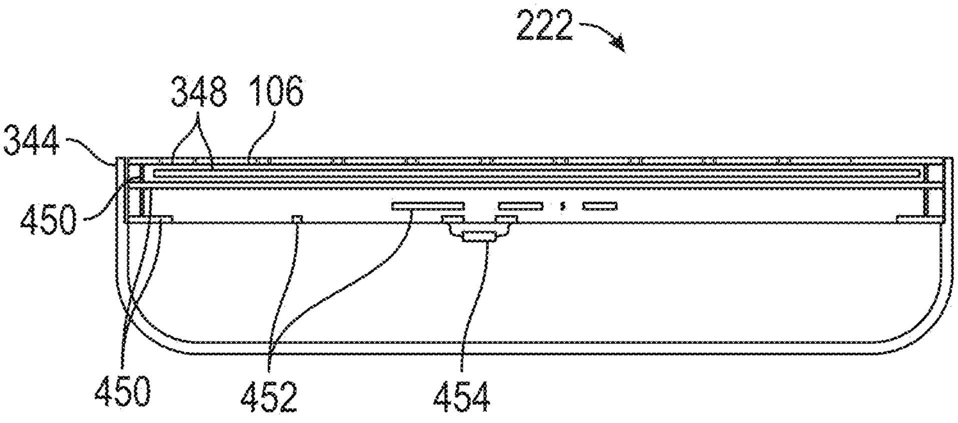
FIGS. 4 and 5 are cross section views of examples of a sensing array to detect residual solvent in a medium that is disposed on a substrate.

FIG. 4 is a cross section view of the example sensing array 222 in FIG. 3. As in FIG. the sensing plates 106 that face the substrate are shown facing up. The cross section view shows additional ground layers 450, circuit layers 452, and an integrated circuit component 454. The circuit layers 452 and integrated circuit component 454 may include components of the measurement circuit 100 shown in FIG. 1. The guard conductor 348 is not connected to the ground layers 450. The guard conductor 348 and sensing plates 106 are modulated with the same electrical signal such that there is virtually no differential voltage difference between the guard conductor 348 and sensing plates 106. Current is measured separately on each of the sensing plates 106. No current is measured on the guard conductor 348. The guard conductor 348 shields the sensing plates 106 from measuring capacitance on all sides of the plates other than the facing side, so that a sensing plate can only measure in the direction of the substrate and media. It is possible to modulate the power supply of the electronics with the same superimposed modulation, so that any internal parasitics from the sense plate to the electronics also does not contribute.

Figure 5:
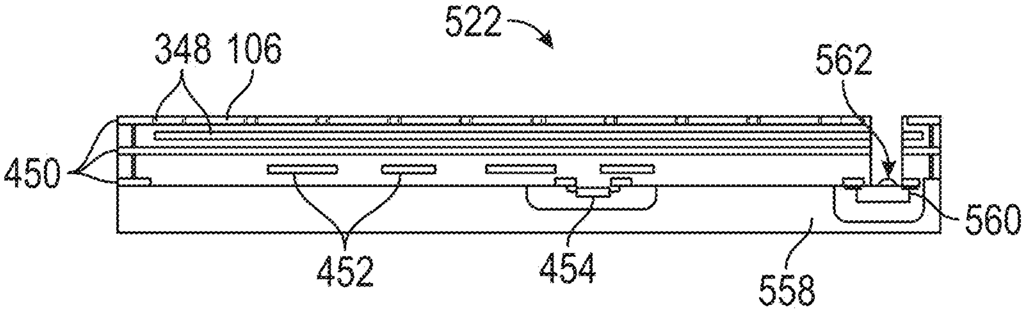

FIG. 5 is a cross section view of another example of a sensing array 522 of multiple electromagnetic impedance sensors useable in the system of FIG. 2 to detect residual solvent. The sensing array 522 includes a sensing bar 558. The sensing bar may be a solid piece of metal with milled out cavities for electrical components such as integrated circuit component 454. The sensing bar 558 with the cavities may be connected to earth ground. The sensing array 522 may include a thickness sensor 560 or a distance sensor in one of the cavities. The thickness sensor 560 or distance sensor may be an optical sensor including lens 562.

Returning to FIG. 2, the controller 232 may provide averaging circuitry that averages the measured impedance from the electromagnetic impedance sensors 224 in the first direction 226 to record one row of averaged impedance in the second direction 228 perpendicular to the sheet. The averaging may be a form of filtering to address signal to noise issues in the measurements. The averaging may take into account the movement and alignment of different samples taken at different times from the array, to allow for the speed of movement of the foil.

In some examples, the controller 232 provides calibration circuitry that calibrates the impedance measurements of the electromagnetic impedance sensors 224. A portion of the electromagnetic impedance sensors 224 are configured to measure the electromagnetic impedance of a portion of the substrate 104 void of the medium to be measured. In some examples, the medium is laid out in a grid on the substrate 104 with areas void of the media and areas having the media. The voids in the medium may be at the edges were extra sensors can provide a continuous reference of the measurement to 104, while other voids in medium may occur in patches along film movement, for example for calendaring, when this is the case these void areas are exposed periodically to the same sensors as used to detect the medium residual solvent content and can then also be used to calibrate the individual sensor responses.

Figure 6:
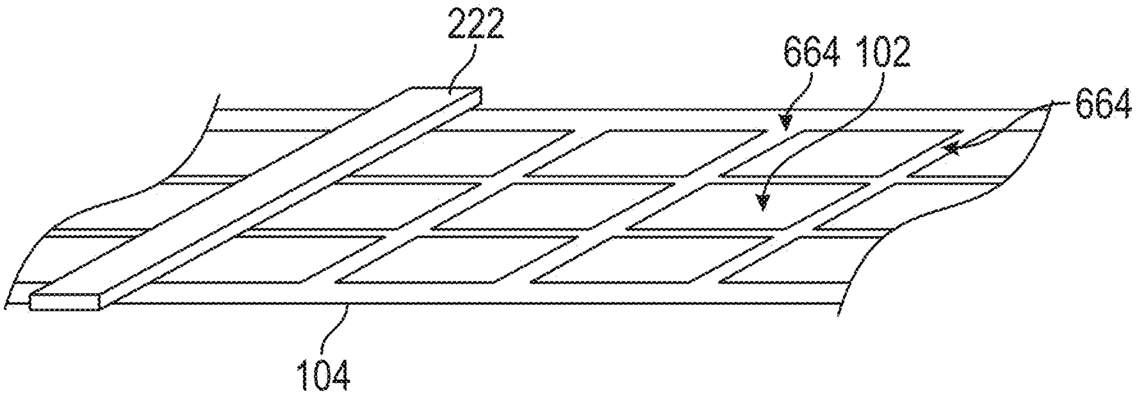
FIG. 6 is an illustration of an example of media disposed on a substrate.

FIG. 6 is an illustration of a substrate 104 having a grid of areas including the media 102 to be measured and areas 664 void of the media. One or more electromagnetic impedance sensors of the sensing arrays 222 are positioned to measure the electromagnetic impedance (e.g., capacitance) of areas 664 of the substrate that excludes the media.

Returning to FIG. 2, the controller 232 calibrates the measurements of electromagnetic impedance of the media 102 and substrate 104 using the measurements of electromagnetic impedance without the media 102. The calibration impedance can be subtracted from the measured impedances where the media 102 is present. The result is contactless measurement of impedance over sections of the substrate and any residual solvent is reflected in the impedance measurements. Also, when the values of capacitance after heating asymptote to a nominal value, the information of capacitance in those areas versus the areas without medium, can be used to estimate the thickness, this can be used in addition or instead of any thickness measurement 180.

Figure 7:
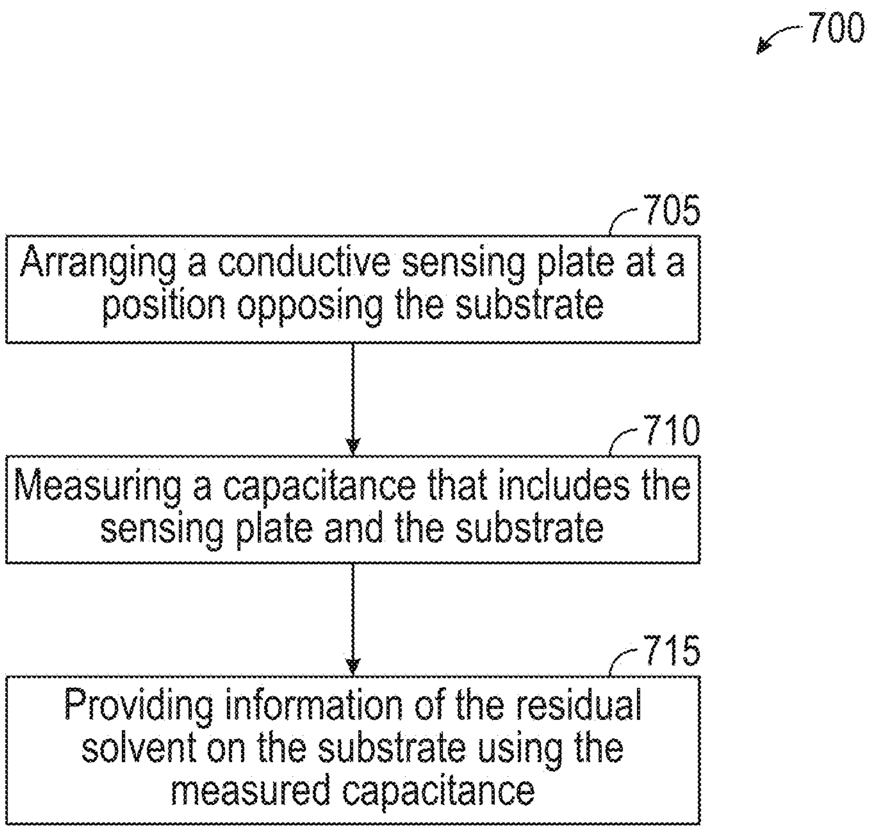
FIG. 7 is a flow diagram of a method of detecting residual solvent in media deposited on a substrate.

For completeness, FIG. 7 is a flow diagram of a method 700 of detecting residual solvent in media 102 deposited on a substrate. The media 102 may be an emulsion, gel, or porous media that is deposited on metallic foil, or film (e.g., a polymer film), or similar substrate. The solvent may have been added to the media material to make a slurry that is deposited on the substrate 104 and it is desired to determine if any residual solvent remains after drying. The method 700 may be performed using the devices and systems described regarding FIGS. 1-5.

At block 705, a conductive sensing plate 106 is arranged at a position opposing the substrate 104. At block 710, a capacitance is measured that includes the sensing plate 106 and the substrate 104. The measured capacitance also includes the capacitance of the media deposited on the substrate. At block 715, information of the residual solvent on the substrate is obtained using the measured capacitance.

A surface plate 108 may be arranged on the opposite side of the substrate 104 form the sensing plate 106. In some examples, the measured capacitance includes capacitance of the sensing plate 106, substrate 104, media 102, and the surface plate 108. In some examples, multiple sensing plates 106 are arranged above the substrate 104 and the capacitance of multiple locations of the substrate is measured. This can provide location information regarding more specific locations of the substrate where residual solvent is detected.

In some examples, a movement mechanism moves the substrate to multiple heating stages to dry the media 102. The capacitance of the media 102 and substrate 104 may be measured after each heating stage to determine the progress of the drying. The heating may be focused during later heating stages to the areas of the substrate with detected residual solvent. In some examples multiple different frequencies may be used for stimulating the capacitance measurement, and multiple magnitude and phase characteristics used to calculate the residual solvent. This may be done to all sensors at the same time or at different times.

System and methods have been described for contact free measurement of residual solvent or other moisture in media without physically disturbing the media. The non-contact impedance techniques described are mostly capacitance based, with sense plates using electrostatic pickup to sense the media, but it is possible to use inductance and other electromagnetic elements to also stimulate and sense the medias impedance to gather information on its moisture.

ADDITIONAL DESCRIPTION AND ASPECTS

A first Aspect (Aspect 1), includes subject matter (such as a method of detecting residual solvent on a substrate), comprising arranging a conductive sensing plate at a position opposing the substrate; measuring a capacitance that includes the sensing plate and the substrate; and providing information of the residual solvent on the substrate using the measured capacitance.

In Aspect 2, the subject matter of Aspect 1 optionally includes measuring the capacitance between the sensing plate and the substrate.

In Aspect 3, the subject of one or both of Aspects 1 and 2 optionally includes measuring the capacitance between the sensing plate arranged above the substrate and a surface plate arranged under the substrate.

In Aspect 4, the subject matter of one or any combination of Aspects 1-3 optionally includes measuring the capacitance between the sensing plate arranged above the substrate and a surface plate arranged under the substrate; measuring capacitance at multiple locations of the substrate; and providing location information regarding the residual solvent on the substrate.

In Aspect 5, the subject matter of one or any combination of Aspects 1-4 optionally includes arranging multiple sensing plates above the substrate; measuring multiple capacitances that include the multiple sensing plates at multiple locations of the substrate; and providing location information regarding the residual solvent on the substrate.

In Aspect 6, the subject matter of one or any combination of Aspects 1-5 optionally includes arranging multiple sensing plates in a two-dimensional array of sensing plates above the substrate; moving the substrate relative to the multiple sensing plates in a first direction of the two-dimensional array of sensing plates; averaging the measured capacitances that include sensing plates in the first direction of the two-dimensional array of sensing plates; and providing location information regarding the residual solvent on the substrate in a second direction of the two-dimensional array of sensing plates.

In Aspect 7, the subject matter of one or any combination of Aspects 1-6 optionally includes measuring a capacitance that includes the sensing plate, the residual solvent, a medium including the residual solvent disposed on the substrate, and the substrate.

In Aspect 8, the subject matter of Aspect 7 optionally includes determining a calibration capacitance that includes the sensing plate and the substrate and excludes the residual solvent and the medium including the residual solvent; and providing the information of the residual solvent on the substrate using the measured capacitance and the calibration capacitance.

Aspect 9 includes subject matter (such as a measurement apparatus) or can optionally be combined with one or any combination of Aspects 1-8 to include such subject matter, comprising at least one conductive sensing plate; and a capacitance measurement circuit connected to the sensing plate. The capacitance measurement circuit is configured to measure a capacitance that includes the sensing plate, a substrate, and a residual solvent on the substrate when the substrate is arranged below the sensing plate; and provide information of the residual solvent on the substrate using the measured capacitance.

In Aspect 10, the subject matter of Aspect 9 optionally includes a capacitance measurement circuit connectable to the substrate and configured to measure a capacitance that includes the sensing plate, the substrate, the residual solvent, and a medium containing the residual solvent when the substrate is arranged below the sensing plate.

In Aspect 11, the subject matter of Aspect 9 optionally includes a capacitance measurement circuit that includes a surface plate and is configured to measure a capacitance that includes the sensing plate, the substrate, the residual solvent, a medium containing the residual solvent, and the surface plate when the substrate is arranged on the surface plate below the sensing plate.

In Aspect 12, the subject matter of one or any combination of Aspects 9-11 optionally includes a movement mechanism configured to move the substrate relative to the sensing plate, and a measurement circuit configured to measure the capacitance at multiple locations of the substrate; and provide location information regarding the residual solvent on the substrate.

In Aspect 13, the subject matter of one of any combination of Aspects 9-12 optionally includes a capacitance measurement circuit that includes multiple sensing plates and is configured to measure multiple capacitances that include the multiple sensing plates at multiple locations of the substrate; and provide location information regarding the residual solvent on the substrate.

In Aspect 14, the subject matter of one or any combination of Aspects 9-13 optionally includes a movement mechanism configured to move the substrate in a first direction relative to the capacitance measurement circuit; and the capacitance measurement circuit includes multiple sensing plates arranged in a two-dimensional array of sensing plates. The capacitance measurement circuit is optionally configured to measure multiple capacitances that include the multiple sensing plates of the two-dimensional array of sensing plates; average measured capacitances that include sensing plates in the first direction of the two-dimensional array of sensing plates; and provide location information regarding the residual solvent on the substrate in a second direction of sensing plates of the two-dimensional array of sensing plates.

In Aspect 15, the subject matter of one or any combination of Aspects 9-14 optionally includes a capacitance measurement circuit configured to produce a measured capacitance that includes the sensing plate, the residual solvent, a medium including the residual solvent disposed on the substrate, and the substrate; produce a calibration capacitance that includes the sensing plate and the substrate and excludes the residual solvent and the medium including the residual solvent; and provide the information of the residual solvent on the substrate using the measured capacitance and the calibration capacitance.

In Aspect 16, the subject matter of one or any combination of Aspects 9-15 optionally includes multiple sensing plates that each include a facing side facing the substrate; a guard conductor surrounding sides of the sensing plates other than the facing side; and a capacitance measurement circuit is configured to measure multiple capacitances that include the multiple sensing plates at multiple locations of the substrate.

Aspect 17 includes subject matter (such as a system to detect residual solvent in a medium that is disposed on a substrate) or can optionally be combined with one or any combination of Aspects 1-16 to include such subject matter, comprising multiple electromagnetic impedance sensors configured to apply a modulating electrical signal to the medium and the substrate; determine an electromagnetic impedance at multiple locations of the substrate; and detect the residual solvent on the substrate using the determined electromagnetic impedance.

In Aspect 18, the subject matter of Aspect 17 optionally includes capacitance sensors configured to measure a capacitance that includes the medium and the residual solvent; and provide information of the residual solvent on the substrate using the measured capacitance.

In Aspect 19, the subject matter of Aspect 18 optionally includes a thickness sensor configured to measure thickness of the medium; and detection logic circuitry configured to detect the residual solvent on the substrate using the measured capacitance and thickness of the medium.

In Aspect 20, the subject matter of one or any combination of Aspects 17-19 optionally includes calibration logic circuitry, and a portion of the electromagnetic sensors are configured to measure the electromagnetic impedance of a portion of the substrate that is void of the medium. The calibration logic circuitry is configured to calibrate measurements of electromagnetic impedance of the medium and substrate.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

What is claimed is:

1. A method of detecting residual solvent for an electrode material disposed on a substrate, the method including:

arranging a conductive sensing plate at a position opposing the substrate;

measuring a capacitance that includes the sensing plate, the substrate, and the electrode material on the substrate; and providing information of the residual solvent in the electrode material on the substrate using the measured capacitance.

2. The method of claim 1, wherein the measuring the capacitance includes measuring the capacitance between the sensing plate and the substrate.

3. The method of claim 1, wherein the measuring the capacitance includes measuring the capacitance between the sensing plate arranged above the substrate and a surface plate arranged under the substrate.

4. The method of claim 1, including:

moving the substrate relative to the sensing plate;

measuring capacitance at multiple locations of the substrate; and wherein the providing the information includes providing location information regarding the residual solvent on the substrate.

5. The method of claim 1, wherein the arranging the sensing plate includes arranging multiple sensing plates above the substrate;

wherein the measuring the capacitance includes measuring multiple capacitances that include the multiple sensing plates at multiple locations of the substrate; and wherein the providing the information includes providing location information regarding the residual solvent on the substrate.

6. The method of claim 1, wherein the arranging the sensing plate includes arranging multiple sensing plates in a two-dimensional array of sensing plates above the substrate;

wherein the measuring the capacitance includes:

measuring multiple capacitances that include the multiple sensing plates;

moving the substrate relative to the multiple sensing plates in a first direction of the two-dimensional array of sensing plates; and averaging the measured capacitances that include sensing plates in the first direction of the two-dimensional array of sensing plates; and wherein the providing the information includes providing location information regarding the residual solvent on the substrate in a second direction of the two-dimensional array of sensing plates.

7. The method of claim 1, wherein the measuring the capacitance includes:

measuring a capacitance that includes the sensing plate, the residual solvent, a medium including the residual solvent disposed on the substrate, and the substrate.

8. The method of claim 7, including:

determining a calibration capacitance that includes the sensing plate and the substrate and excludes the residual solvent and the medium including the residual solvent; and wherein the providing the information of the residual solvent includes providing the information of the residual solvent on the substrate using the measured capacitance and the calibration capacitance.

9. A measurement apparatus comprising:

at least one conductive sensing plate; and a capacitance measurement circuit connected to the sensing plate and configured to:

measure a capacitance that includes the sensing plate, a substrate, an electrode material, and a residual solvent of a solvent of the electrode material on the substrate when the substrate is arranged below the sensing plate; and provide information of the residual solvent in the electrode material on the substrate using the measured capacitance.

10. The measurement apparatus of claim 9, wherein the capacitance measurement circuit is connectable to the substrate and is configured to measure a capacitance that includes the sensing plate, the substrate, the residual solvent, and a medium containing the residual solvent when the substrate is arranged below the sensing plate.

11. The measurement apparatus of claim 9, wherein the capacitance measurement circuit includes a surface plate and is configured to measure a capacitance that includes the sensing plate, the substrate, the residual solvent, a medium containing the residual solvent, and the surface plate when the substrate is arranged on the surface plate below the sensing plate.

12. The measurement apparatus of claim 9, including:

a movement mechanism configured to move the substrate relative to the sensing plate; and wherein the capacitance measurement circuit is configured to:

measure the capacitance at multiple locations of the substrate; and provide location information regarding the residual solvent on the substrate.

13. The measurement apparatus of claim 9, wherein the capacitance measurement circuit includes multiple sensing plates and is configured to:

measure multiple capacitances that include the multiple sensing plates at multiple locations of the substrate; and provide location information regarding the residual solvent on the substrate.

14. The measurement apparatus of claim 9, including:

a movement mechanism configured to move the substrate in a first direction relative to the capacitance measurement circuit;

wherein the capacitance measurement circuit includes multiple sensing plates arranged in a two-dimensional array of sensing plates and is configured to:

measure multiple capacitances that include the multiple sensing plates of the two-dimensional array of sensing plates;

average measured capacitances that include sensing plates in the first direction of the two-dimensional array of sensing plates; and provide location information regarding the residual solvent on the substrate in a second direction of sensing plates of the two-dimensional array of sensing plates.

15. The measurement apparatus of claim 9, wherein the capacitance measurement circuit is configured to:

produce a measured capacitance that includes the sensing plate, the residual solvent, a medium including the residual solvent disposed on the substrate, and the substrate;

produce a calibration capacitance that includes the sensing plate and the substrate and excludes the residual solvent and the medium including the residual solvent; and provide the information of the residual solvent on the substrate using the measured capacitance and the calibration capacitance.

16. The measurement apparatus of claim 9, including:

multiple sensing plates that each include a facing side facing the substrate;

a guard conductor surrounding sides of the sensing plates other than the facing side; and wherein the capacitance measurement circuit is configured to measure multiple capacitances that include the multiple sensing plates at multiple locations of the substrate.

17. A system to detect residual solvent for an electrode material in a medium that includes the electrode material disposed on a substrate, the system comprising:

multiple electromagnetic impedance sensors configured to:

apply a modulating electrical signal to the medium and the substrate;

determine an electromagnetic impedance of the substrate and the medium, that includes the electrode material and the residual solvent, at multiple locations of the substrate; and detect the residual solvent among the multiple locations on the substrate using the determined electromagnetic impedance.

18. The system of claim 17, wherein the electromagnetic impedance sensors are capacitance sensors configured to:

measure a capacitance that includes the medium and the residual solvent; and provide information of the residual solvent on the substrate using the measured capacitance.

19. The system of claim 18, including:

a thickness sensor configured to measure thickness of the medium; and detection logic circuitry configured to detect the residual solvent on the substrate using the measured capacitance and thickness of the medium.

20. The system of claim 17, including:

calibration logic circuitry;

wherein a portion of the electromagnetic sensors are configured to measure the electromagnetic impedance of a portion of the substrate that is void of the medium; and wherein the calibration logic circuitry is configured to calibrate measurements of electromagnetic impedance of the medium and substrate.

* * * * *